United States Patent [19]

Katz

[11] Patent Number: 5,614,301
[45] Date of Patent: Mar. 25, 1997

[54] CHEMICAL PROTECTIVE FABRIC

[75] Inventor: Martin Katz, Wellesley, Mass.

[73] Assignee: The United States of America as represented by the Secretary of the Army, Washington, D.C.

[21] Appl. No.: 422,964

[22] Filed: Apr. 15, 1995

[51] Int. Cl.$^6$ .............. B32B 5/16; B32B 5/18; B32B 5/26; B32B 5/30
[52] U.S. Cl. ............... 442/315; 428/214.2; 428/314.8; 428/317.1; 442/370
[58] Field of Search .................. 428/244, 248, 428/249, 261, 262, 264, 265, 267, 283, 290, 314.2, 314.8, 317.1

[56] References Cited

U.S. PATENT DOCUMENTS

| | | | |
|---|---|---|---|
| 4,045,609 | 8/1977 | Hart | 428/253 |
| 4,082,694 | 4/1978 | Wennerberg et al. | 502/427 |
| 4,454,191 | 6/1984 | von Blucher et al. | 428/244 |
| 4,455,187 | 6/1984 | von Blucher et al. | 156/277 |
| 4,510,193 | 4/1985 | Blucher et al. | 428/196 |
| 4,677,019 | 6/1987 | Blucher | 428/244 |
| 4,850,579 | 7/1989 | Fisher | 269/21 |
| 4,872,220 | 10/1989 | Haruvy et al. | 428/286 |
| 4,954,392 | 9/1990 | Goldberg | 428/244 |
| 5,017,424 | 5/1991 | Farnworth et al. | 428/230 |
| 5,416,056 | 5/1995 | Baker | 502/425 |

*Primary Examiner*—Kathleen Choi
*Attorney, Agent, or Firm*—Vincent J. Ranucci; Anthony T. Lane

[57] ABSTRACT

A chemical protective fabric for use in garments worn by persons in a chemically hostile environment comprises a layer of felted foam impregnated with superactivated carbon, a polyurethane emulsion binder for bonding the superactivated carbon to the foam, a first stretchable material layer bonded to the layer of foam on a first of the major surfaces thereof, and a second stretchable material layer bonded to the layer of foam on a second of the major surfaces thereof.

16 Claims, 1 Drawing Sheet

CHEMICAL PROTECTIVE FABRIC

STATEMENT OF GOVERNMENT INTEREST

The invention described herein may be manufactured, used and licensed by or for the Government for Governmental purposes without the payment to me of any royalty thereon.

BACKGROUND OF THE INVENTION

1. Field of the Invention

The invention relates to fabric providing protection to persons against chemical agents, and is directed more particularly to such a fabric having a sufficiently small thickness and light weight and sufficient stretch characteristics to find utility in protective undergarments, socks, gloves, and the like.

2. Description of the Prior Art

It is known to provide chemical protective garments for persons in a chemically-threatening environment, such as a battle field. In U.S. Pat. No. 5,017,424, issued May 21, 1991, to Brian Farnsworth, et al, there is disclosed a chemical/biological protective garment for persons. The Farnsworth garment provides a stretch characteristic which enhances the wearability of the garment.

However, there exists a need for such protective garments of a material which is lighter in weight, smaller in thickness, more air permeable, launderable without loss of chemical protection, and still retaining the desirable stretchability.

SUMMARY OF THE INVENTION

It is, therefore, an object of the invention to provide a chemical protective fabric adapted to provide protection to persons against chemical agents.

Another object of the invention is to provide such a material as is relatively small in thickness, light in weight, and sufficiently elastic to provide comfort and close fit when used in undergarments, socks, gloves, and the like.

A further object of the invention is to provide such a material with increased air permeability.

A still further object of the invention is to provide such a material which is launderable without loss of chemical protection.

With the above and other objects in view, as will hereinafter appear, a feature of the present invention is the provision of a chemical protective fabric for use in garments worn by persons in a chemically hostile environment, the fabric comprising a layer of compressed foam impregnated throughout with superactivated carbon, a polyurethane emulsion binder for bonding the superactivated carbon to the compressed foam, a first material layer having stretchable qualities, such as knit or non-woven material, bonded to the layer of compressed foam on a first of the major surfaces thereof, and a second knit material layer bonded to the layer of compressed foam on a second of the major surfaces thereof.

In accordance with further features of the invention, the fabric is of a thickness of about 0.050–0.090 inch and a weight of about 8.0–11.1 oz/yd$^2$. The layer of compressed, or felted, foam is of reticulated polyurethane which, in conjunction with the first and second knit material layers, provides for fabric air permeability. Accordingly, there is provided a relatively thin, light weight, air-permeable fabric suited for undergarments, socks, gloves, and the like.

The above and other features of the invention, including various details of construction and combinations of elements, will now be more particularly described with reference to the accompanying drawings and pointed out in the claims. It will be understood that the particular fabric embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention, from which its novel features and advantages will be apparent.

In the drawing.

DESCRIPTION OF THE PREFERRED EMBODIMENT

Figure 1:
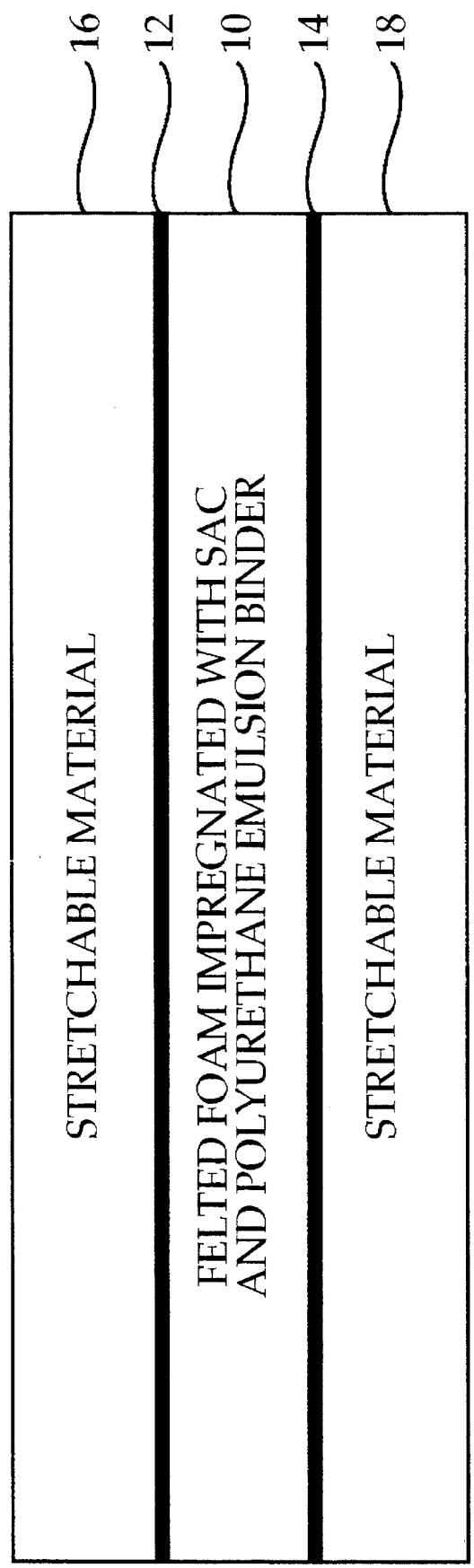
FIG. 1 is a diagrammatic representation of a chemical protective fabric illustrative of an embodiment of the invention.

Referring to FIG. 1, it will be seen that an illustrative chemical protective fabric includes a central layer 10 of compressed (felted) foam impregnated in opposite major surfaces 12, 14 thereof with superactivated carbon (SAC). A polyurethane emulsion binder is used to bond the SAC to the felted foam. In practice, the SAC and the binder are components in a slurry with which the compressed felted foam layer is impregnated. The fabric further includes a first material layer 16 having stretchable qualities, such as knit or non-woven material, bonded to the layer 10 of felted foam on a first 12 of the major surfaces thereof, and a second material layer 18 having stretchable qualities, such as knit or non-woven material, bonded to the layer 10 of felted foam on a second 14 of the major surfaces thereof.

The felted foam of the central layer 10 is a reticulated polyurethane or polyester polyurethane foam which, in combination with the stretchable material layers 16, 18, provides for air permeability in the fabric. The foam preferably includes about 90–110 cells per square inch and preferably is compressed in thickness by a factor of about 4–6, permitting use of a central layer including the SAC and binder, of about 0.020–0.035 inch thick. The relatively high cell count in the central layer 10 contributes to a weight of only about 5.4–5.5 Oz/yd$^2$. The SAC provided has a BET surface area of 2200–3200 m$^2$/g carbon.

The first and second stretchable material layers may be of the same material, which preferably is a textile such as aramid, cotton or nylon, and, in a preferred embodiment, are each about 0.010–0.024 inch thick and are of a weight of about 1.0–2.3 oz/yd$^2$.

Accordingly, the fabric is of a thickness of about 0.050–0.090 inch, including the stretchable layers bonding agent and a weight of about 8.0–11.1 oz., including the stretchable layer bonding agent, providing sufficient thickness and lightness to be acceptable for use in undergarments, gloves, socks, and the like. Further, the felted foam and the outer cover fabric layers are all readily stretchable, providing the fabric with the stretch characteristics necessary for comfortable wear. Still further, the use of polyurethane emulsion as the binder to bond the SAC to the felted foam has been found to render the fabric completely launderable. That is, there is no substantial loss of SAC during repeated laundering operations. Thus, the fabric may be kept clean by frequent laundering.

The use of high capacity SAC reduces the carbon loading requirements by as much as 40% over prior art protective fabrics, reducing the weight and thickness of the central layer 10, and contributing to the comfort of the wearer.

There is thus provided a chemical protective fabric reduced in thickness, reduced in weight, and sufficiently elastic to provide comfort and close fit in garments made therefrom. The fabric further is air permeable, contributing to comfort of a wearer, and is easy to maintain in a clean condition.

It is to be understood that the present invention is by no means limited to the particular construction herein disclosed and/or shown in the drawings, but also comprises any modifications or equivalents within the scope of the claims. For example, it is apparent that other compressed foams having different compositions, and a wide range in thickness, weight, and compression, may be used, and that alternative materials may be used in place of nylon in the two outer layers.

Having thus described my invention, what I claim as new and desire to secure by Letters of Patent of the United States is:

1. A chemical protective fabric for use in garments worn by persons in a chemically hostile environment, said fabric comprising:

a layer of felted foam material impregnated throughout with superactivated carbon, said material having opposite major surfaces, and said superactivated carbon being a highly activated carbon having a BET surface area of 2200–3200 square meters per gram;

a polyurethane emulsion binder for bonding said superactivated carbon to said foam, said superactivated carbon and said binder being components in a slurry with which slurry said felted foam is impregnated, whereby said foam is impregnated with and is bonded to said superactivated carbon;

a first stretchable material layer bonded to said layer of felted foam material on a first of said major surfaces thereof; and a second stretchable material layer bonded to said layer of felted foam on a second of said major surfaces thereof.

2. The fabric in accordance with claim 1, wherein said felted foam comprises reticulated polyester polyurethane foam which, in combination with said stretchable material layers, provides for air permeability of said fabric.

3. The fabric in accordance with claim 2, wherein said foam comprises about 90–110 cells per square inch and is compressed in thickness by a factor of about 4–6.

4. The fabric in accordance with claim 1 wherein said layer of felted foam, including said carbon and said binder, is about 0.020–0.035 inch thick.

5. The fabric in accordance with claim 3, wherein said layer of compressed felted foam, including said carbon and said binder, is about 0.020–0.035 inch thick.

6. The fabric in accordance with claim 4, wherein said layer of felted foam, including said carbon and said binder, weighs about 5.4–5.5 oz/yd$^2$.

7. The fabric in accordance with claim 1, wherein said first and second stretchable material layers are of the same material.

8. The fabric in accordance with claim 7, wherein said stretchable material is a material selected from a group consisting of knit and non-woven materials.

9. The fabric in accordance with claim 8, wherein said stretchable material is selected from a group consisting of nylon, aramid and cotton.

10. The fabric in accordance with claim 1, wherein said first and second stretchable material layers are of a material selected from a group consisting of aramid, cotton and nylon.

11. The fabric in accordance with claim 9, wherein said first and second stretchable material layers are about 0.010–0.024 inch thick.

12. The fabric in accordance with claim 11, wherein said stretchable material is of a weight of about 1.0–2.3 oz/yd$^2$.

13. The fabric in accordance with claim 6 wherein said first and second stretchable materials each weigh about 1.0–2.3 oz/yd$^2$ and said fabric weighs about 8.0–11.1 oz/yd$^2$.

14. The fabric in accordance with claim 5, wherein said layer of felted foam weighs about 5.4–5.5 oz/yd$^2$.

15. The fabric in accordance with claim 10, wherein said fabric is of a thickness of 0.050–0.090 inch and a weight of 8.0–11.1 oz/yd$^2$.

16. The fabric in accordance with claim 14, wherein each of said first and second stretchable material layers is of a material which weighs about 1.0–2.3 oz/yd$^2$ and said fabric weighs about 8.0–11.1 oz/yd$^2$.

* * * * *